Jan. 15, 1952 R. J. KENNY 2,582,755
INTERNAL EXPANDING BRAKE
Filed Sept. 18, 1947 4 Sheets-Sheet 1

Inventor
R. J. Kenny
By Glascock Downing Seebold
Attys.

Jan. 15, 1952     R. J. KENNY     2,582,755
INTERNAL EXPANDING BRAKE

Filed Sept. 18, 1947     4 Sheets-Sheet 2

Inventor
R. J. Kenny
By Glascock Downing Subtle
Attys

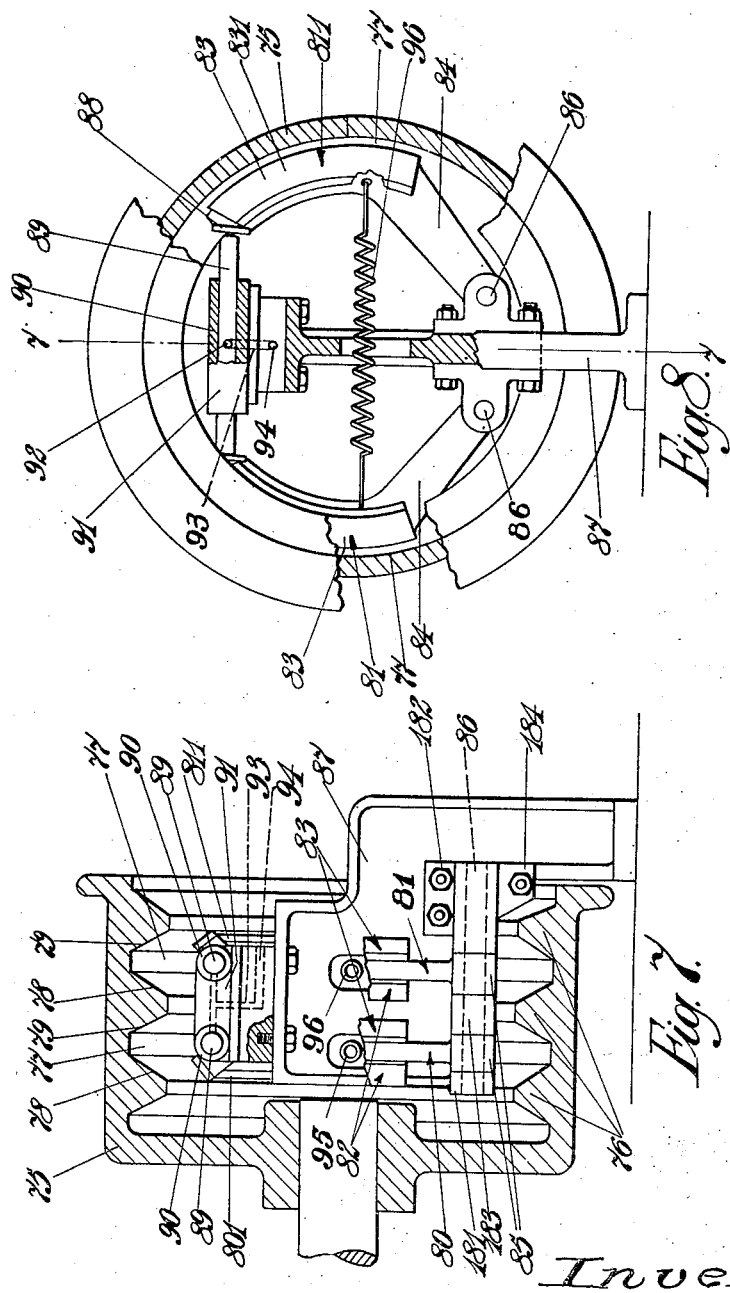

Jan. 15, 1952      R. J. KENNY      2,582,755
INTERNAL EXPANDING BRAKE
Filed Sept. 18, 1947      4 Sheets-Sheet 4
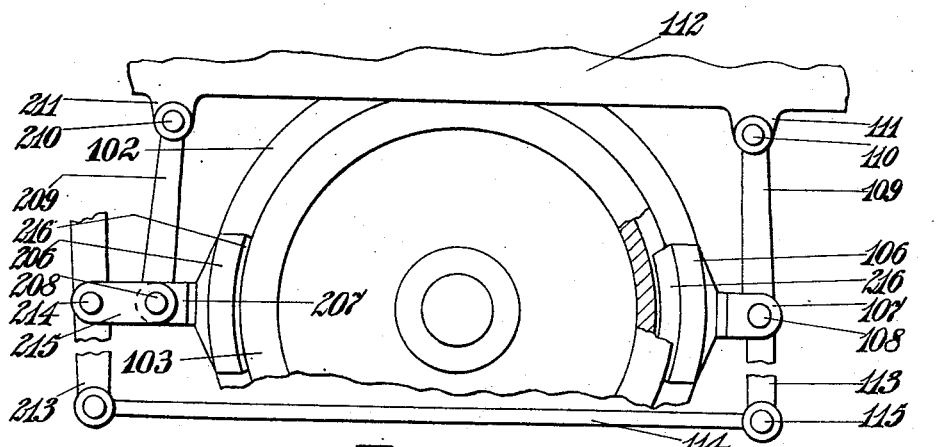
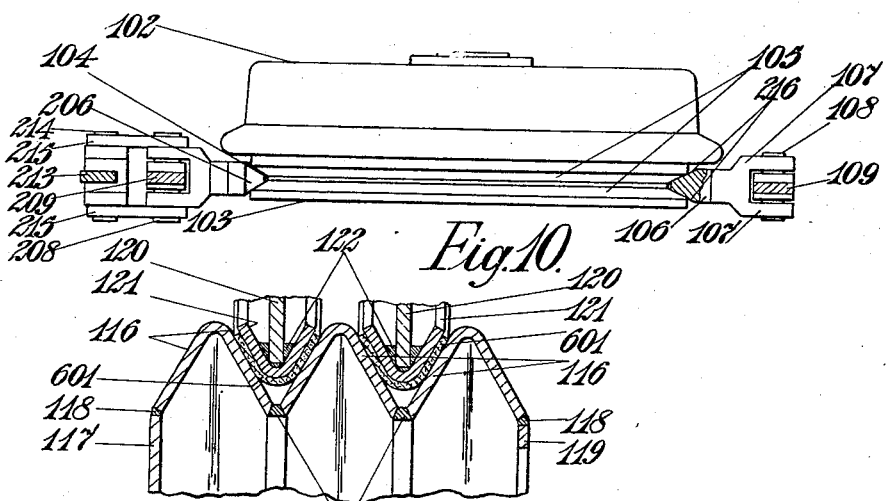
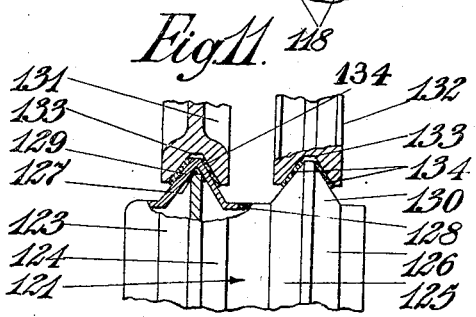
Inventor
R. J. Kenny Patented Jan. 15, 1952

2,582,755

UNITED STATES PATENT OFFICE 2,582,755

INTERNAL EXPANDING BRAKE

Richard Joseph Kenny, Yeovil, England

Application September 18, 1947, Serial No. 774,859
In Great Britain May 8, 1947

2 Claims. (Cl. 188—78)

This invention relates to brakes for road vehicles, railway vehicles, engines, aircraft and haulage winders, of the type comprising a hollow rotary element having at least one pair of internal convergent circumferential braking surfaces which co-operate with brake shoes having arcuate inclined braking surfaces and pivotally mounted on a non-rotary element so as to enable the said arcuate braking surfaces to be brought into frictional engagement with the braking surfaces of the rotary element.

The main object of the present invention is to provide a brake device of the type referred to, in which the necessity of dividing the hollow rotary element circumferentially to enable the brake shoes to be inserted into and removed from the rotary element is avoided.

Figure 2:
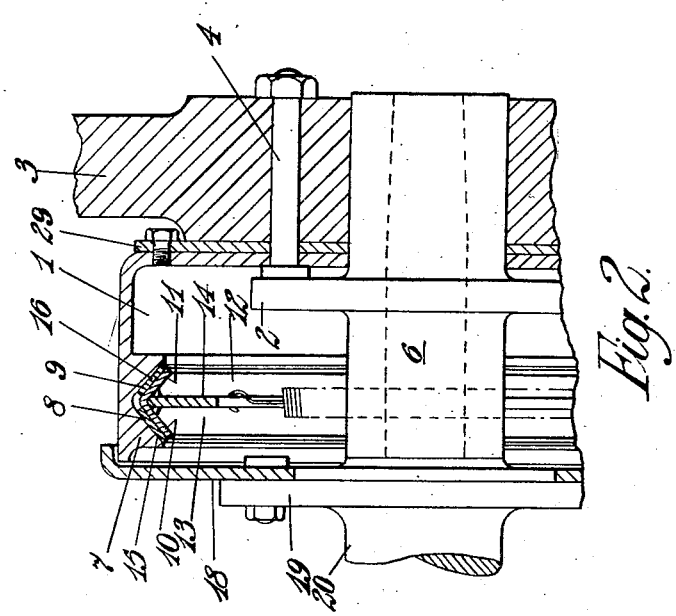
Figure 1:
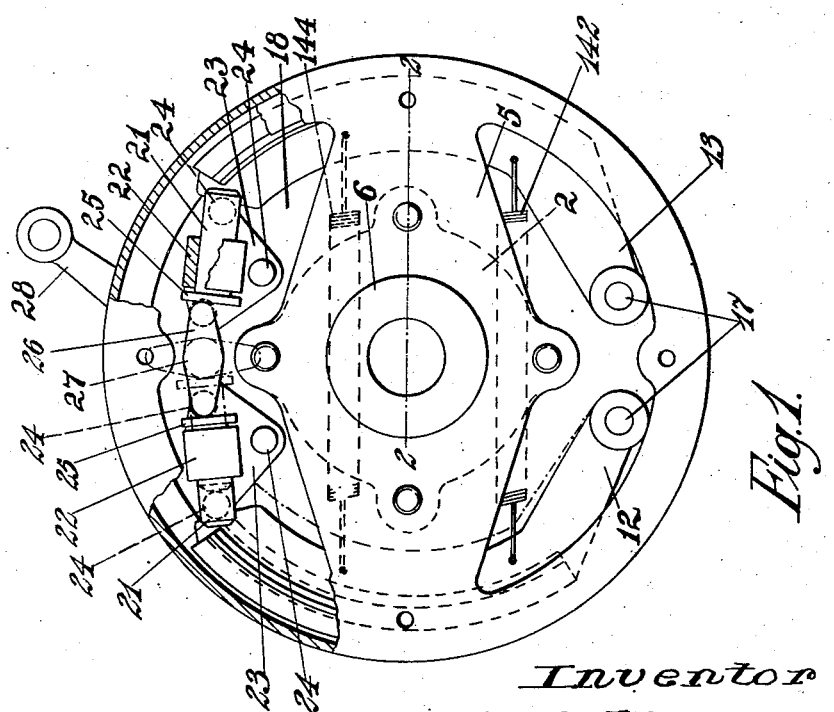
Figure 3:
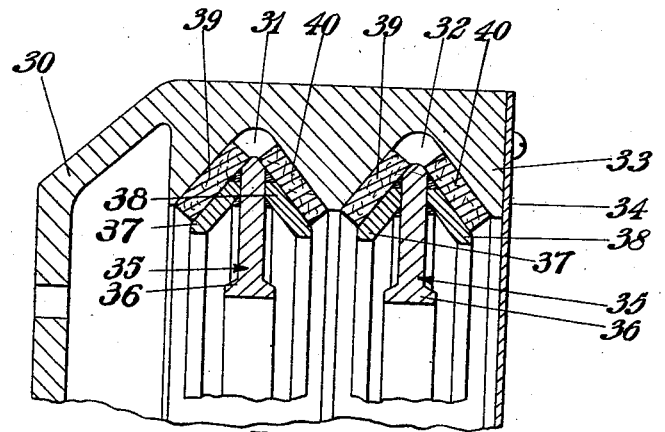
Figure 4:
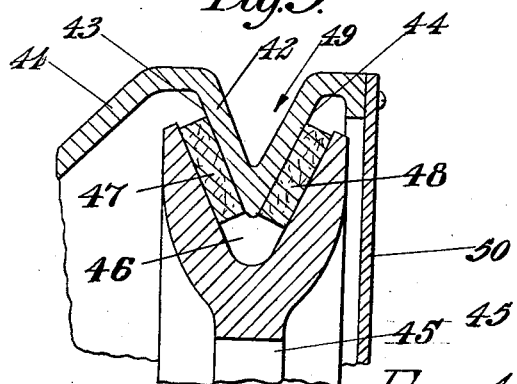
Figures 5, 6:
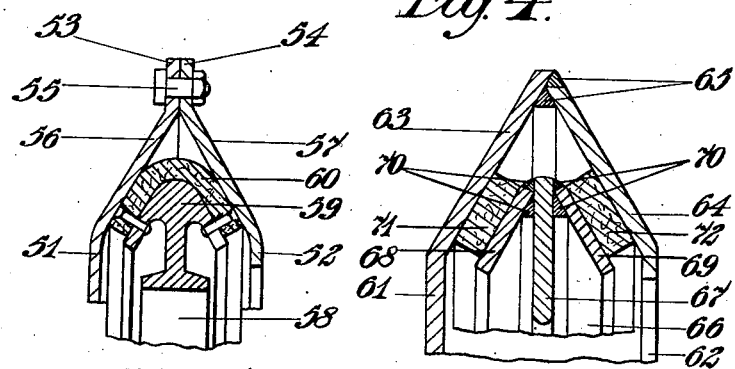

The invention is illustrated by way of example in the accompanying drawings, in which:

Figure 1 is an end elevation of an automobile brake device according to the invention, Figure 2 is a part horizontal section on the line 2—2 of Figure 1, Figure 3 is a detail view of a modified form of brake drum, in horizontal section, having two circumferential V-section channels, together with brake shoes co-operating therewith, Figures 4 to 6 are similar detail horizontal sections of further modified forms of brake drums and co-operating brake shoes, Figure 7 is a vertical longitudinal section on the line 7—7 of Figure 8 of a winding drum provided with a brake device according to the invention, Figure 8 is an end view of the winding drum and brake device shown in Figure 7.

Referring to Figures 1 and 2, 1 is a brake drum which is removably attached to the driving flange 2 for the road wheel 3 of an automobile by means of the studs 4 serving for bolting the wheel to the driving flange, the said studs passing through a two-armed spider 5 integral with the drum and having a central hole through which passes the sleeve 6 on which the wheel is mounted. The drum 1 is provided with an integral circumferential projection 7 in the inside thereof, the said projection having a V-section channel machined in it, the sides of which form two circumferential braking surfaces 8, 9 adapted to co-operate with braking surfaces provided on peripheral arcuate flange members 10, 11 of a pair of brake shoes 12, 13.

The flange members 10, 11, which are provided with friction linings 15, 16, comprise a V-section hollow ring which is welded to a central rib 14 of each brake shoe, so as to form a circumferential V-section ridge. The brake shoes are pivoted at their lower ends on studs 17 fixed to the anchor plate 18 which is bolted to a flange 19 on the axle 20 of the vehicle in known manner. At their upper ends, the ribs 14 of the brake shoes extend beyond the ends of the flange members 10, 11 and are engaged by the slotted outer ends of plungers 21 which are slidable in bored guide members 22 having flange members 23 by means of which they are removably connected to the anchor plate 18 by means of bolts 24, only the heads of which are shown. The inner ends of the plungers 21 are provided with heads 25 which are engaged by a two-armed operating cam 26 integral with a shaft 27 which is rotatable in the anchor plate 18 in the usual manner and is actuated by means of an operating lever 28. The parts inside the brake drum are protected by a cover plate 29 which is removably attached thereto.

In the position of the parts shown in Figure 1, the brake blocks are applied to the brake drum with the friction linings 15, 16 in frictional contact with the braking surfaces 8, 9 of the brake drum 1. By turning the brake lever 28 anti-clockwise until the cam 26 is in the vertical position shown in broken lines, the brake shoes are retracted by the coil springs 141, 142, which are attached to the ribs 14 of the shoes, until they assume the position shown in broken lines in Figure 1.

The brake drum 1 is separable from the wheel 3, so that the latter can be removed from the sleeve 6 without disturbing the brake drum. When it is required to remove the brake drum 1, the cover plate 29 is removed and the drum is rotated until it is in the position shown in Figure 1. The plungers 21 are then retracted and the brake shoes are wedged apart by any suitable means so as to withdraw the upper ends of the ribs 14 from the outer ends of the plungers 21. The bored guide members 22 are then removed from the anchor plate 18 and the brake shoes are moved inwardly until the outer edges of the friction linings 15, 16 are clear of the inner edges of the projection 7. The brake drum 1 can then be removed axially to enable the brake shoes to be removed for renewing the friction linings or other purposes.

Figure 3 shows an embodiment of the invention, in which a cast iron brake drum 30 is employed having an internal annular projection 33 in which two V-section grooves 31, 32 are machined, so as to form two pairs of convergent inclined circumferential braking surfaces. Two brake shoes 35, 36 are shown in engagement with the brake drum, the said brake shoes having peripheral V-section ridges which are built up from shaped steel plates 37, 38 of frusto-conical section, welded to a central rib member 35. The sides of the ridges 37, 38 have friction linings 39, 40 attached thereto which are adapted to coact with the sides of the grooves 31, 32 when the shoes are applied to the brake drum. The brake drum 30 is closed by a cover plate 34.

In Figure 4, the brake drum is made of sheet metal and is provided with a hollow V-section ridge 42, extending circumferentially on the inside of the drum and the external sides 43, 44 of which form two convergent inclined braking surfaces. The brake shoe 45 is provided with a peripheral V-section groove 46 to the sides of which are attached brake linings 47, 48, the inclination of the sides of the groove 46 being such that when the brake shoe is applied to the brake drum, the friction linings 47, 48 will seat on the sides 43, 44 of the ridge 42.

The sides of the circumferential indentation 49 in the outside of the drum 41 formed by the hollow ridge 42 increase the cooling surface provided by the walls of the brake drum shown in Figure 4.

In Figure 5, the brake drum comprises two shaped steel or cast iron ring plates 51, 52 of hollow frusto-conical shape having peripheral flanges 53, 54 respectively, by means of which they are bolted together by bolts 55, only one of which is shown. The interior walls of the conical parts 56, 57 of the plates 51, 52 form the inclined braking surfaces for co-operation with a brake shoe 58 which is provided with an integral arcuate V-section ridge 59, the sides of which are covered with a frictional brake lining comprising a single strip 60 of the lining material bent over the ridge to the shape of a V.

Figure 6 shows a modification of the brake drum structure shown in Figure 5, in which the drum comprises two shaped steel ring plates 61, 62 of frusto-conical shape, the outer edges of the conical portions 63, 64 of which are connected together at 65 by welding; the interior walls of said conical parts forming inclined braking surfaces. The brake shoe 66 is also built up from shaped steel plates and comprises a central web plate 67 which is welded at 70 to two frusto-conical flange members 68, 69. Each of the flanges 68, 69 has a frictional brake lining strip 71, 72 secured to it, respectively, for co-operation with the braking surfaces on the brake drum.

Figures 7 and 8 show an embodiment of the invention applied to a winding drum 75, which is provided in its interior with three circumferential V-section projections 76 forming between them two V-section channels 77, the sides 78, 79 of which act as braking surfaces with which two pairs of brake shoes 80, 801 and 81, 811, respectively, co-operate. Each brake shoe comprises a pair of inclined arcuate flanges 82, 83 which converge to form a peripheral ridge adapted to fit one of the channels 77, the said flanges being provided with friction linings 821, 831, respectively which coact with the sides 78, 79 of the said channel 77. The flanges 82, 83 are integral with a rib member 84 which is extended beyond the lower ends of the flanges 82, 83 to form an arm which is provided at its free end with an eye 85.

The eyes 85 of the brake shoes encircle pivot spindles 86 on a stationary carrier 87 which projects into the winding drum 75. The spindles 86 are fixed at their inner ends to lugs 181 integral with the carrier 87, and at their outer ends to brackets 182 bolted to the carrier 87. At the ends remote from the eyes 85, the brake shoes are provided with bearing surfaces formed by plates 88 welded to the ends of the ribs 84 against which bear the outer ends of plungers 89 which are slidable in cylinders 90 formed in a cylinder block 91 bolted to the carrier 87. The cylinders 90 are provided with ports 92 which communicate with ducts 93 in open communication with an inlet opening 94 through which fluid under pressure can be admitted to the cylinders to force the plungers 90 outwardly and apply the brake shoes to the braking surfaces 78, 79. The brake shoes 80, 801 and 81, 811 are retracted from the braking surfaces 78, 79 by coil springs 95, 96 respectively.

When it is required to remove the brake shoes and the operating mechanism therefor from the interior of the drum 75, the plungers 89 are first withdrawn into the cylinders 90 and the brake shoes are then expanded again by any suitable means. The cylinder block 91 is then removed from the carrier 87 and the brake shoes are moved inwardly to clear the inner edges of the projections 76, whereupon the carrier 87, together with the parts mounted thereon, is withdrawn axially from the interior of the drum 75. The eyes 85 of the brake shoes are spaced by loose spacing rings 183 on the spindles 86 and by removing the brackets 182, the brake shoes can be removed without disturbing the carrier 87.

The advantages secured by the brake according to the present invention as compared with the brakes hitherto known are as follows: the braking power for the same force employed is increased, which also means reduced strain on the brake gear for the same braking power available today; the braking surface is increased; the V-shaped construction reduces the possibility of the drums becoming oval under pressure and prevents the shoes from wandering as on the flat surface of an ordinary drum, which also means improved braking efficiency; finally, it should also be possible with this construction, to make use of smaller diameters than in the case of the ordinary brake, thereby reducing the unsprung weight for wheeled vehicles, which is most desirable nowadays.

I claim:

1. The combination of a hollow rotary element having at least one pair of internal convergent circumferential braking surfaces, with a non-rotary element, a pair of brake shoes having arcuate inclined braking surfaces for co-operation with each pair of circumferential braking surfaces of the rotary element and pivoted on the non-rotary element for movement into and out of frictional relationship with said braking surfaces of the rotary element, said brake shoes being capable of displacement on the non-rotary element into a completely withdrawn position with the peripheral edges thereof clear of the inner peripheral edges of the braking surfaces of the rotary element, so as to permit of axial displacement of the rotary and non-rotary elements, one with respect to the other, spring means connected to the brake shoes to urge them out of frictional relationship with the braking surfaces of the rotary element, and brake applying means including guiding means mounted on the non-rotary element and plungers arranged for reciprocation in said guiding means with one end of each plunger in engagement with one of the respective brake shoes, said guiding means and plungers being removable from the non-rotary element to enable the brake shoes to be moved into the completely withdrawn position.

2. The combination of a non-rotary axle member having a flange thereon, a rotary member mounted on said axle member, a brake drum open at one end and having integral supporting arms at the other end for connecting it to the rotary member with the open end adjacent said flange, said brake drum having a pair of internal convergent circumferential braking surfaces, a pair of brake shoes pivoted on said flange for movement towards and away from said braking surfaces and having arcuate inclined braking surfaces for co-operation with the braking surfaces of the brake drum, said brake shoes being capable of displacement into a completely withdrawn position with the peripheral edges thereof clear of the inner peripheral edges of the braking surfaces of the brake drum, spring means connected to the brake shoes to urge them out of frictional relationship with the braking surfaces of the brake drum, and brake applying means including guiding means mounted on said flange and plungers arranged for reciprocation in said guiding means with one end of each plunger in engagement with one of the brake shoes, said guiding means being capable of removal from the flange and adapted to be passed into and out of the brake drum through the spaces between the supporting arms and the inner periphery of the drum, to enable the brake shoes to be displaced into said completely withdrawn position.

RICHARD JOSEPH KENNY.

REFERENCES CITED

The following references are of record in the file of this patent:

UNITED STATES PATENTS

| Number | Name | Date |
| --- | --- | --- |
| 1,577,005 | Walker | Mar. 16, 1926 |
| 1,599,448 | White | Sept. 14, 1926 |
| 1,625,103 | Smith | Apr. 19, 1927 |
| 1,972,288 | Brewster | Sept. 4, 1934 |
| 2,117,683 | Sanzedde | May 17, 1938 |
| 2,161,904 | Sinclair | June 13, 1939 |
| 2,190,052 | Van Raalte | Feb. 13, 1940 |
| 2,238,954 | Stewart | Apr. 22, 1941 |

FOREIGN PATENTS

| Number | Country | Date |
| --- | --- | --- |
| 546,215 | Great Britain | July 2, 1942 |